United States Patent
Nilsson et al.

(10) Patent No.: US 10,214,207 B2
(45) Date of Patent: Feb. 26, 2019

(54) VEHICLE OBSERVABILITY ENHANCING SYSTEM, VEHICLE COMPRISING SUCH SYSTEM AND A METHOD FOR INCREASING VEHICLE OBSERVABILITY

(71) Applicant: VOLVO CAR CORPORATION, Gothenburg (SE)

(72) Inventors: Jonas Nilsson, Molndal (SE); Mattias Erik Brannstrom, Gothenburg (SE); Mohammad Ali, Angered (SE)

(73) Assignee: Volvo Car Corporation, Gothenburg (SE)

( * ) Notice: Subject to any disclaimer, the term of this patent is extended or adjusted under 35 U.S.C. 154(b) by 250 days.

(21) Appl. No.: 15/281,339

(22) Filed: Sep. 30, 2016

(65) Prior Publication Data
US 2017/0101091 A1  Apr. 13, 2017

(30) Foreign Application Priority Data
Oct. 7, 2015  (EP) ..................... 15188746

(51) Int. Cl.
*B60W 30/08* (2012.01)
*B60W 10/20* (2006.01)
*B60W 30/095* (2012.01)
*B60W 30/12* (2006.01)
*B60W 30/16* (2012.01)

(52) U.S. Cl.
CPC ............ *B60W 30/08* (2013.01); *B60W 10/20* (2013.01); *B60W 30/0953* (2013.01); *B60W 30/0956* (2013.01); *B60W 30/12* (2013.01); *B60W 30/16* (2013.01); *B60W 2720/10* (2013.01); *B60W 2750/306* (2013.01); *B60W 2750/308* (2013.01)

(58) Field of Classification Search
CPC .. B60W 30/08; B60W 30/16; B60W 30/0956; B60W 30/0953; B60W 20/10; B60W 30/12; B60W 2750/308; B60W 2750/306; B60W 2720/10
See application file for complete search history.

(56) References Cited

U.S. PATENT DOCUMENTS 8,874,267 B1 * 10/2014 Dolgov .................... G08G 1/16
                                                                    700/255
9,744,969 B2 *  8/2017 Kim ...................... B60W 30/16

FOREIGN PATENT DOCUMENTS

DE    102008012644    9/2009
EP         2492165    8/2012

OTHER PUBLICATIONS

Extended European Search Report for European Application No. EP 15188746.0, Completed by the European Patent Office, dated Mar. 15, 2016, 6 Pages.

* cited by examiner

*Primary Examiner* — Anne M Antonucci
(74) *Attorney, Agent, or Firm* — Brooks Kushman P.C.

(57) ABSTRACT

A vehicle, a method and a vehicle observability enhancing system are provided. The system is configured to determine if a host vehicle is positioned within selectively one of an observable zone (A) of at least one detected vehicle, or an unsafe unobservable zone (B) of the at least one detected vehicle. If the host vehicle is positioned within the observable zone (A), the system is arranged to generate a control signal indicative of maintaining the host vehicle in the observable zone (A) of the at least one detected vehicle for at least a predefined time duration before the host vehicle is allowed to enter an unsafe unobservable zone (B) of the at least one detected vehicle.

10 Claims, 5 Drawing Sheets

VEHICLE OBSERVABILITY ENHANCING SYSTEM, VEHICLE COMPRISING SUCH SYSTEM AND A METHOD FOR INCREASING VEHICLE OBSERVABILITY

CROSS-REFERENCE TO RELATED APPLICATIONS

This application claims foreign priority benefits under 35 U.S.C. § 119(a)-(d) to European patent application number EP 15188746.0, filed Oct. 7, 2015, which is incorporated by reference in its entirety.

TECHNICAL FIELD

Embodiments herein relate to a vehicle observability enhancing system. Embodiments herein further relate to a vehicle comprising a vehicle observability enhancing system and to a method for increasing vehicle observability.

BACKGROUND

Many different factors influence safety in traffic situations. For example, vehicle velocity, weather conditions, road conditions and visibility.

A vehicle operator normally continuously monitors the host vehicle surrounding during driving. He/she generally has a good view in a forward direction through the windshield and may thus relatively easy observe the host vehicle surrounding in the forward direction. Hence, he/she can take any observed objects in the forward direction into account when planning an upcoming trajectory for the host vehicle.

The vehicle operator may be able to observe the host vehicle surrounding relatively well in oblique directions forward, except for fields hidden behind A-pillars of the host vehicle. When looking sideways, through side windows of the host vehicle, the vehicle operator can observe the host vehicle surrounding at a left hand and a right hand side of the host vehicle. However, he/she can often only turn his/her head sideways for a short period of time before he/she has to shift focus forward again, wherefore it may be difficult to perceive objects at the left/right hand side of the host vehicle well enough to be able to observe all potential dangers. Further, some fields of his/her view may be hidden behind B-pillars of the host vehicle.

Some rearward directions and sideways directions may be observed via exterior and/or interior rear-view mirrors but some other rearward directions and sideways directions may be difficult or impossible for the vehicle operator to monitor. Such directions or zones are also commonly referred to as blind spots.

Some vehicles are equipped with sensors which aim to aid the vehicle operator in the task of monitoring the vehicle surrounding. Such sensors may also provide information to automatic or autonomous drive systems of the host vehicle. Such systems may provide some semi-automatic, automatic and/or autonomous drive functions and may e.g. assist in lateral and/or longitudinal control of the host vehicle.

The sensors may, at least to some extent, cover some zones which are difficult to monitor for a vehicle operator or a vehicle drive system. However, sensors add costs to vehicles and sensor failure may occur. Further, it may be difficult for a host vehicle operator or a host vehicle drive system to assess if surrounding vehicles are aware of the presence of the host vehicle. Thus, improvements related to safety in traffic situations where more than one vehicle is present are still needed.

SUMMARY

Embodiments herein aim to provide a vehicle observability enhancing system which increases safety in in traffic situations where more than one vehicle is present.

According to an embodiment, this is provided by a host vehicle observability enhancing system comprising a processing unit and at least one sensor which is arranged to monitor a sensor coverage area of a host vehicle surrounding and further to provide the processing unit with information on detected vehicles within the sensor coverage area, wherein the vehicle observability enhancing system is arranged to determine if the host vehicle is positioned within selectively one of; an observable zone of at least one detected vehicle, an unsafe unobservable zone of the at least one detected vehicle, or a safe unobservable zone of at least one detected vehicle, and, if the host vehicle is positioned within the observable zone, arranged to generate a control signal indicative of maintaining the host vehicle in the observable zone of the at least one detected vehicle for at least a predefined time duration before the host vehicle is allowed to enter an unsafe unobservable zone of the at least one detected vehicle.

Since the vehicle observability enhancing system is arranged to determine if the host vehicle is positioned within an observable zone or an unsafe unobservable zone of a detected vehicle and arranged to generate a control signal indicative of maintaining the host vehicle in the observable zone of the at least one detected vehicle for at least a predefined time duration before the host vehicle is allowed to enter an unsafe unobservable zone of the at least one detected vehicle, the observability of host vehicle is increased. Hereby a risk that the detected vehicle will drive along a trajectory which intersects with an upcoming trajectory for the host vehicle is decreased. Thus, since a probability that a driver within the detected vehicle observes the host vehicle is increased, a risk that he/she e.g. suddenly changes lane into the host vehicle lane is decreased.

Thus, hereby is provided a vehicle observability enhancing system which increases safety in in traffic situations where more than one vehicle is present.

According to some embodiments the host vehicle observability enhancing system is, if the host vehicle is determined to be positioned within the safe unobservable zone of at least one detected vehicle, arranged to generate a control signal indicative of positioning the host vehicle in an observable zone of at that least one detected vehicle.

Since the host vehicle observability enhancing system is arranged to determine if the host vehicle is positioned within the safe unobservable zone of at least one detected vehicle, and if so, arranged to generate a control signal indicative of positioning the host vehicle in an observable zone of at least one detected vehicle, traffic safety is enhanced. The probability that the host vehicle is observed is increased whereby a risk for collision is decreased. Since the positioning of the host vehicle is based on the relative position of the host vehicle and the detected vehicle, the positioning of the host vehicle in an observable zone of at least one detected vehicle can be performed independently of whether other vehicles than the at least one detected vehicle is within the sensor monitoring area of the host vehicle surrounding. Positioning of the host vehicle in the observable zone can for example be performed in a situation where an adaptive cruise control system is controlling a host vehicle velocity to be larger than a velocity of the detected vehicle. The host vehicle may then have to pass or overtake the detected vehicle. If the host vehicle is driven with a velocity substantially equal or lower than the velocity of the detected vehicle, the host vehicle can continue to be positioned within the safe unobservable zone of the detected vehicle.

According to some embodiments the predefined time duration is at least 3 seconds. This time duration has proven to be sufficient for enhancing observability in many traffic situations. In some embodiments the time duration is shorter, such as at least 1 or 2 seconds, in some embodiments the time duration is longer, such as about 4-10 seconds. The sufficient time duration can also depend on the relative positions between the host vehicle and the detected vehicle. In some fields of view, 1-3 seconds can be sufficient; in other field of view more than 3 seconds may be desirable.

According to some embodiments the host vehicle observability enhancing system comprises a semi-autonomous drive arrangement which is arranged to control at least one of steering and velocity of the host vehicle at least partly based on information received from the at least one sensor, and where the semi-autonomous drive arrangement further is arranged to control the host vehicle in accordance with the control signal. Hereby observability is taken into account e.g. when an adaptive cruise control controls at least some drive functions of the host vehicle. The semi-autonomous drive arrangement is then controlled to drive the host vehicle such that it is clearly visible for the detected vehicle before it enters an unsafe unobservable zone of the detected vehicle.

According to some embodiments the host vehicle observability enhancing system comprises an autonomous drive arrangement which is arranged to autonomously control steering and velocity of the host vehicle at least partly based on information received from the at least one sensor, and where the autonomous drive arrangement further is arranged to autonomously control the host vehicle in accordance with the control signal. Hereby observability is taken into account during autonomous driving. Since the host vehicle is observable for drivers of vehicles around the host vehicle, safety is enhanced.

According to some embodiments the vehicle system comprises an alert arrangement, which may comprise a display, one or more lamps or lighted icons, or a motor for producing a tactile sensation for a driver, arranged to generate at least one of a visual alert, an audio alert, a haptic alert, into a host vehicle passenger compartment in accordance with the control signal.

Since an alert is generated, a host vehicle operator is alerted and/or informed about when the host vehicle is observable or not. Actions made by the vehicle operator can then be based on a more complete set of information than if no alert would have been generated.

According to some embodiments the vehicle system is arranged to divide the sensor coverage area into different zones based on the relative positions of the host vehicle and at least one detected vehicle. Hereby an assessment on which zone of a detected vehicle the host vehicle is driving within is performed in a reliable and fast manner.

According to some embodiments the vehicle observability enhancing system is arranged to generate a control signal indicative of at least one of a first host vehicle velocity profile and a first host vehicle steering profile to the semi-autonomous drive arrangement when the host vehicle is positioned within an observable zone of at least one detected vehicle, and at least one of; a second host vehicle velocity profile and a second host vehicle steering profile when the host vehicle is positioned within an unsafe unobservable zone of the at least one detected vehicle. Hereby the host vehicle can be driven with different velocity and/or along different trajectories depending on which zone the host vehicle is positioned/driving in relatively at least one detected vehicle.

According to some embodiments the vehicle observability enhancing system is arranged to generate a control signal indicative of at least one of a first host vehicle velocity profile and a first host vehicle steering profile to the autonomous drive arrangement when the host vehicle is positioned within an observable zone of at least one detected vehicle, and at least one of a second host vehicle velocity profile and a second host vehicle steering profile when the host vehicle is positioned within an unsafe unobservable zone of the at least one detected vehicle. Hereby the host vehicle can be driven with different velocity and/or along different trajectories depending on which zone the host vehicle is positioned/driving in relatively at least one detected vehicle.

Embodiments herein also aim to provide a vehicle comprising a vehicle observability enhancing system which increases safety in traffic situations where more than one vehicle is present.

According to some embodiments, this is provided by a vehicle comprising a vehicle observability enhancing system according to embodiments disclosed herein.

Embodiments herein also aim to provide a method for increasing vehicle observability in traffic situations where more than one vehicle is present.

According to some embodiments, this is provided by a method for increasing vehicle observability for a vehicle comprising a host vehicle observability enhancing system comprising a processing unit and at least one sensor which is arranged to monitor a sensor coverage area of a host vehicle surrounding and further to provide the processing unit with information on detected vehicles within the sensor coverage area, wherein the method comprises; determining, by the vehicle observability enhancing system, if the host vehicle is positioned within selectively one of an observable zone of at least one detected vehicle, an unsafe unobservable zone of the at least one detected vehicle, or a safe unobservable zone of at least one detected vehicle, and, if the host vehicle is positioned within the observable zone, generating a control signal indicative of maintaining the host vehicle in the observable zone of the at least one detected vehicle for at least a predefined time duration before the host vehicle is allowed to enter an unsafe unobservable zone of the at least one detected vehicle.

Since the method comprises the step of generating a control signal indicative of maintaining the host vehicle in the observable zone of the at least one detected vehicle for at least a predefined time duration before the host vehicle is allowed to enter an unsafe unobservable zone of the at least one detected vehicle, safety is enhanced.

According to some embodiments the method comprises generating, if it is determined that the host vehicle is positioned within the safe unobservable zone of at least one detected vehicle, a control signal indicative of positioning the host vehicle in an observable zone of that at least one detected vehicle.

BRIEF DESCRIPTION OF THE DRAWINGS

The various embodiments herein, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings. Like numbers refer to like elements throughout. Well-known functions or constructions will not necessarily be described in detail for brevity and/or clarity.

Figure 1:
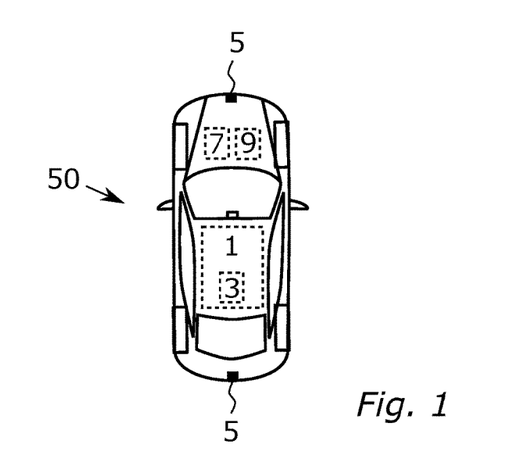
FIG. 1 illustrates a host vehicle and a vehicle observability enhancing system according to some embodiments.

FIG. 1 illustrates a host vehicle 50. The host vehicle 50 may be a car, a truck, a bus or any other type of road vehicle. The host vehicle 50 comprises a host vehicle observability enhancing system 1. The purpose of the host vehicle observability enhancing system 1 is to increase safety in various traffic situations by avoiding, or at least reducing a risk that collisions will occur. The features and functions of the host vehicle observability enhancing system 1 are explained below.

The host vehicle observability enhancing system 1 comprises one or more processing units 3 and one or more sensors 5. The sensor or sensors 5 are arranged to monitor a sensor coverage area of a host vehicle surrounding.

The sensor or sensors 5 can be one or more camera sensors, one or more radar sensors and/or one or more Lidar-sensors or any combination thereof. The at least one sensor 5 can be arranged at any position in/on the host vehicle 50 from where detection of a vehicle surrounding is possible. Sensors 5 may for example be arranged at a vehicle front-, side and/or rear portion, at a vehicle grille, bumpers, rear-view-mirrors and/or a windshield. Some sensors 5 may be arranged in or near a vehicle compartment, chassis, motor, drivetrain and/or wheels. A sensor position may depend on the type of sensor used. For example, a camera sensor may be arranged at an inside of a windshield, while one or more radar sensors and/or a Lidar sensor may be arranged in the grille and/or bumpers.

A camera sensor may be e.g. a front-, side- or rear facing digital camera equipped with or connected to one or more processors with object recognition logics. Hereby surrounding objects, such as road lanes, other vehicles, traffic signs, pedestrians, animals, different obstacles etc. may be detected, and in some cases identified/classified. Radar sensors include transmitters that emit signals that bounce back from objects around the host vehicle 50, and receivers that receive the returned signals. The radar sensors may include, e.g., ultra-wide band radars, narrow band radars and/or multi node radars. Lidar-sensors measures distances to objects through illuminating the objects with lasers and analyzing the reflected light. Other types of sensors 5 used to monitor the vehicle surrounding may be e.g. ultrasonic sensors and/or infrared sensors.

The sensor or sensors 5 comprises, or is connected to, logic for determining distance and direction to detected road users, such as surrounding vehicles. Such logic is also arranged to determine velocity, acceleration and other detectable information relating to one or more detected vehicles around the host vehicle 50. Such logic can also detect or determine heading angles for detected vehicles and is capable of comparing such information with host vehicle information on e.g. host vehicle velocity, acceleration, heading, etc. Hereby the sensors 5, together with the logic, are capable of providing the host vehicle observability enhancing system 1 with information on the interrelation between the host vehicle 50 and detected vehicles.

The one or more processing units 3 can be e.g. a central processor/processing unit, CPU. A CPU is hardware that carries out instructions of a computer program/logic when this is executed by performing basic arithmetical, logical, and input/output operations. The processing unit 3 may also comprise an accelerated/advanced processing unit, APU and an application programming interface, API, which specifies how software components should interact with each other.

In some embodiments the vehicle observability enhancing system 1 comprises, or is connected to, one or more semi-autonomous drive arrangements 7, which can provide some automatic- or semi-autonomous drive functions. The host vehicle 50 can be driven semi-autonomously when one or more semi-autonomous drive arrangements 7 are activated. Examples of such subsystem are: adaptive cruise control systems, lane departure control systems, collision avoidance systems, traffic sign recognition systems, communication systems, navigation systems, ultrasonic sensor systems, infrared camera systems, inertial measuring systems, intelligent transportation systems, safe road train systems, automatic parking systems etc.

In some embodiments the vehicle observability enhancing system 1 comprises, or is connected to, an autonomous drive arrangement 9, which allows the host vehicle 50 to be driven autonomously along a route or a road. The autonomous drive arrangement 9 can comprise an electrical/mechanical control arrangement, arranged to control steering and velocity of the host vehicle 50, at least partly based on information received from the sensors 5. The autonomous drive arrangement 9 is connected to a vehicle steering system, such that the autonomous drive arrangement, directly or indirectly, can control a direction of at least some of the wheels of the host vehicle 50. Hereby e.g. a yaw rate of the host vehicle 50 can be adjusted, such that the driving direction of the host vehicle 50 is adjusted in accordance with the input from the autonomous drive arrangement 9. The autonomous drive arrangement 9 is also connected to a host vehicle propulsion arrangement, such as an internal combustion engine or electrical motor, and a host vehicle braking system, such that the autonomous drive arrangement 9, directly or indirectly, can control acceleration and/or deceleration of the host vehicle 50. The autonomous drive arrangement 9 can e.g.

increase a host vehicle velocity by increasing the engine speed, and decrease the host vehicle velocity by engine-braking or by activation of one or more wheel brakes. The autonomous drive arrangement 9 may e.g. be connected to an ABS (anti-lock braking system), such that one or more wheel brakes can be activated selectively.

Figure 2:
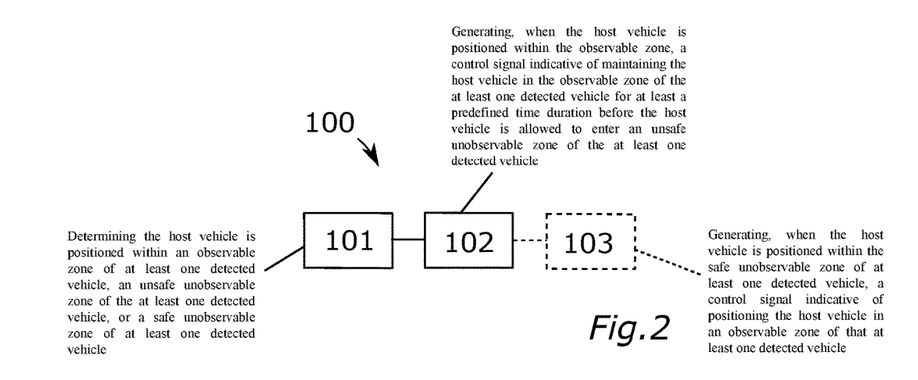
FIG. 2 illustrates a method for increasing vehicle observability according to some embodiments.

In FIG. 2 a method 100 for increasing vehicle observability for a vehicle comprising a host vehicle observability enhancing system according to embodiments herein is described. The vehicle observability enhancing system comprises a processing unit and at least one sensor which is arranged to monitor a sensor coverage area of a host vehicle surrounding. The vehicle observability enhancing system is further arranged to provide the processing unit with information on detected vehicles within the sensor coverage area.

The method 100 comprises; determining 101, by the vehicle observability enhancing system, if the host vehicle is positioned within selectively one of; an observable zone of at least one detected vehicle, an unsafe unobservable zone of the at least one detected vehicle, or a safe unobservable zone of at least one detected vehicle.

The method 100 further comprises; generating 102, if the host vehicle is positioned within the observable zone, a control signal indicative of maintaining the host vehicle in the observable zone of the at least one detected vehicle for at least a predefined time duration before the host vehicle is allowed to enter an unsafe unobservable zone of the at least one detected vehicle.

In some embodiment the method 100 further comprises; generating 103, if it is determined that the host vehicle is positioned within the safe unobservable zone of at least one detected vehicle, a control signal indicative of positioning the host vehicle in an observable zone of that at least one detected vehicle.

Figure 3:
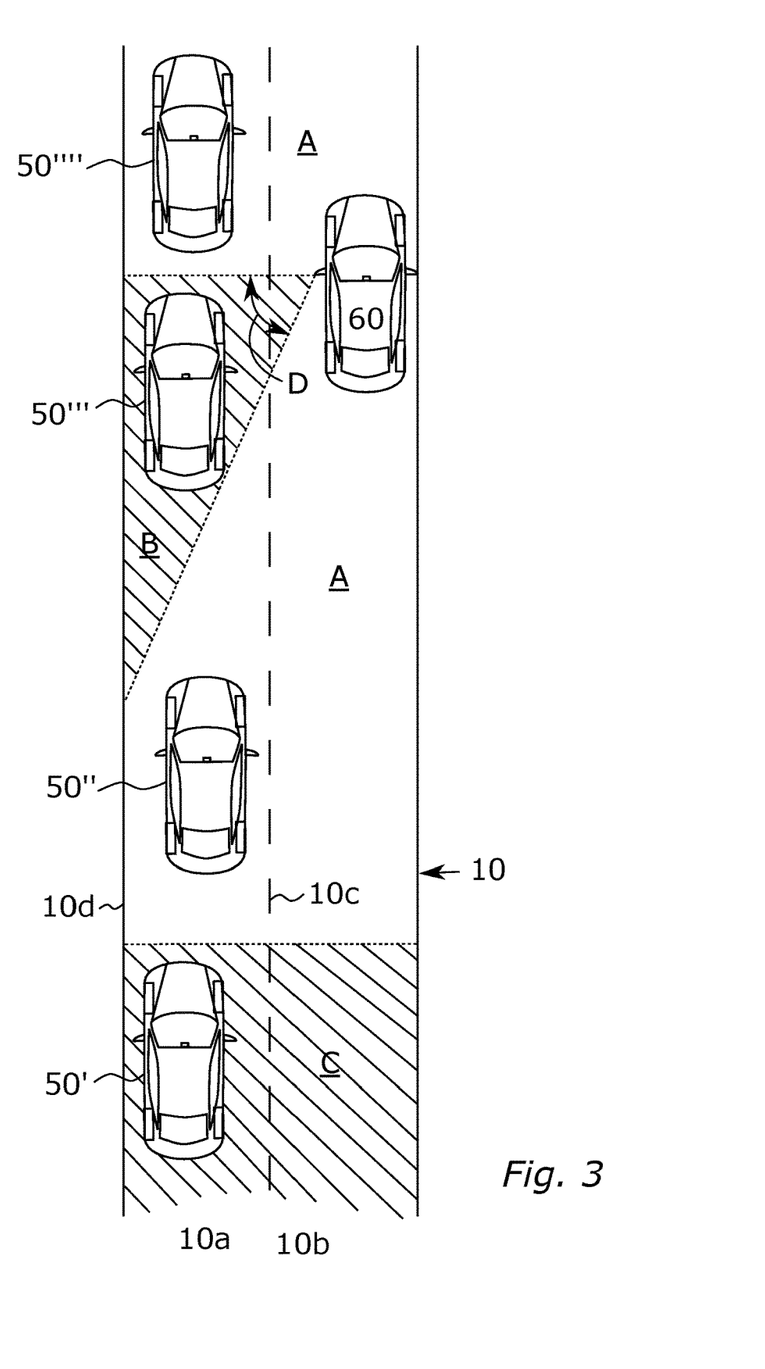
FIG. 3 illustrates a host vehicle and a detected vehicle in a road environment with two traffic lanes according to some embodiments.

FIG. 3 illustrates a traffic scenario in which a host vehicle 50 is driven on a left side lane 10a of a road 10 comprising the left side lane 10a and a right side lane 10b, as viewed in FIG. 3. In FIG. 3 another vehicle 60, driving in the right side lane 10b, is illustrated. The vehicle 60 may be referred to as a surrounding vehicle 60, since it is driving in the surrounding of the host vehicle 50. The vehicle 60 may also be referred to as a detected vehicle, since sensors of the host vehicle is configured to detect the vehicle 60. As mentioned above, the at least one sensor 5 is arranged to provide the processing unit 3 with information on the detected vehicle 60 when the vehicle 60 is within the sensor coverage area. The sensor coverage area is the area which is monitored via host vehicle sensors, and within which various objects can be detected.

In FIG. 3 three different types of zones are illustrated. Zones denominated A are one of more zones which a driver of the detected vehicle 60 normally can observe without hindrance. Such zones may e.g. be fields of visions ahead of the vehicle 60, seen through a windshield. Such zones may also be fields of vision to the rear of the vehicle 60, monitored via a rear view mirror. Any field of vision which a driver of the vehicle 60 normally relatively easily can monitor, continuously or at desired intervals, is referred to as observable zones A.

Zones denominated B and C are one or more zones which normally are, at least to a certain extent, unobservable for a driver of the detected vehicle 60. Zones B and C are therefore referred to as unobservable zones.

Zone B in FIG. 3 is an unobservable zone which is relatively near the detected vehicle 60. In other words, zone B is a blind spot of vehicle 60. It is often difficult for a driver of the vehicle 60 to observe objects which are located in the unobservable zone B. For example, it can be very difficult for the driver of vehicle 60 to observe or be aware of another vehicle which drives with approximately the same velocity as the vehicle 60 and which is driving in the unobservable zone B. Since the driver of vehicle 60 may be unaware of a vehicle 50 which drives near the vehicle 60 he/she may decide to switch lane from 10b to 10a at short notice. Such a maneuver may cause vehicle 50 and vehicle 60 to collide if none of the vehicles' brakes, steer away from the other vehicle or similar. Since such a scenario is potentially unsafe, such an unobservable zone is referred to as an unsafe unobservable zone. The unsafe unobservable zone B can for example be defined as a sector which extends rearwards an angle D from a lateral axis which intersects two exterior rear-view mirrors vehicle 60. Such an angle D can for example be 20-70 degrees.

Zone C in FIG. 3 is an unobservable zone which is relatively far from the detected vehicle 60. A driver of vehicle 60 may have difficulties to observe vehicles in the unobservable zone C, but due to the distance between host vehicle 50 and vehicle 60 a risk for a collision between the vehicles is not imminent. Zone C is therefore referred to as a safe unobservable zone.

In the scenario depicted in FIG. 3 the host vehicle 50 drives in the left side lane 10a with a velocity higher than a velocity of the vehicle 60 driving in the right side lane 10b.

In some embodiments, such as the embodiments illustrated in FIG. 3, the host vehicle observability enhancing system is arranged to determine, via sensors and logic as described above, if the host vehicle 50 is positioned within a safe unobservable zone C of the detected vehicle 60, i.e. if the host vehicle is in position 50'. If so, the host vehicle observability enhancing system is arranged to generate a control signal indicative of positioning the host vehicle 50 in the observable zone A of the detected vehicle 60 for at least a predefined time duration. The host vehicle 50 is then positioned in position 50" for a number of seconds, such that a driver of vehicle 60 readily will have ample time to observe host vehicle 50 before it is allowed to enter the unsafe unobservable zone B of the vehicle 60.

According to some embodiments the control signal also indicates that the unsafe unobservable zone B should be passed relatively quickly when the host vehicle 50 enters the unsafe unobservable zone B after the predefined time duration in the observable zone A. A host vehicle velocity is then higher in the unsafe unobservable zone B than in the observable zone A. In some embodiments the host vehicle velocity in the unsafe unobservable zone B is also higher than in the safe unobservable zone C.

If the host vehicle 50 comprises a semi-autonomous or autonomous drive arrangement such drive arrangement can be used to control the host vehicle in accordance with the control signal. If the host vehicle 50 is driven manually, the control signal can trigger an alert to be activated such that the host vehicle driver may take the alert into account when operating the host vehicle 50.

An autonomous or semi-autonomous drive system can, via the control signal, be controlled to follow different velocity and/or steering profiles in the different zones. For example, in the FIG. 3 illustrated scenario the host vehicle 50 can be controlled to drive relatively slow and near a road lane 10c in position 50''. Hereby the host vehicle 50 is more visible from the detected vehicle 60. When the host vehicle 50 approaches position 50''' in the unsafe unobservable zone B the velocity is relatively high. In addition, the host vehicle 50 can be controlled to steer towards a left side road lane 10d such that a safety distance between the vehicles is increased.

When the host vehicle 50 is again positioned in position 50' in an observable zone A, the velocity of the host vehicle 50 can again be decreased.

Figures 4A, 5A:
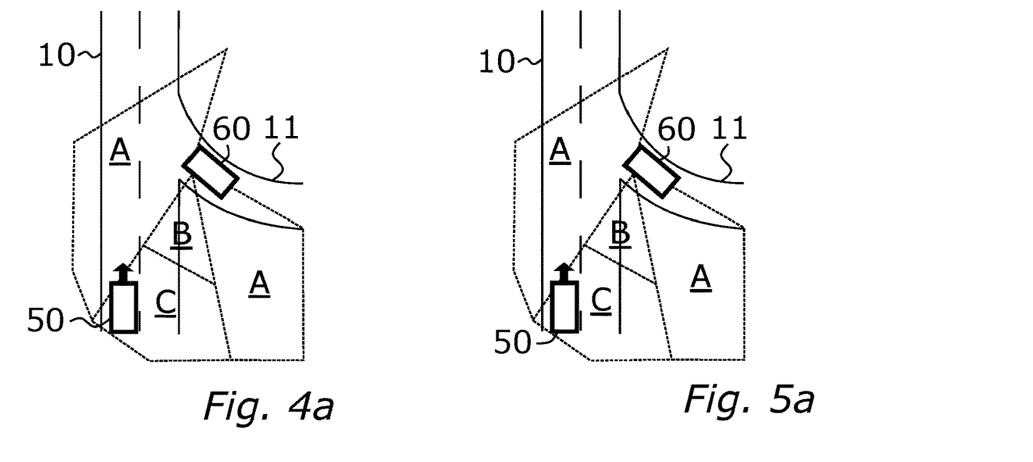
FIGS. 4a, 4b and 4c illustrate a host vehicle and a detected vehicle in a road environment with a road and an acceleration lane according to the prior art.
FIGS. 5a, 5b and 5c illustrate a host vehicle and a detected vehicle in a road environment with a road and an acceleration lane according to some embodiments herein.
Figures 4B, 5B:
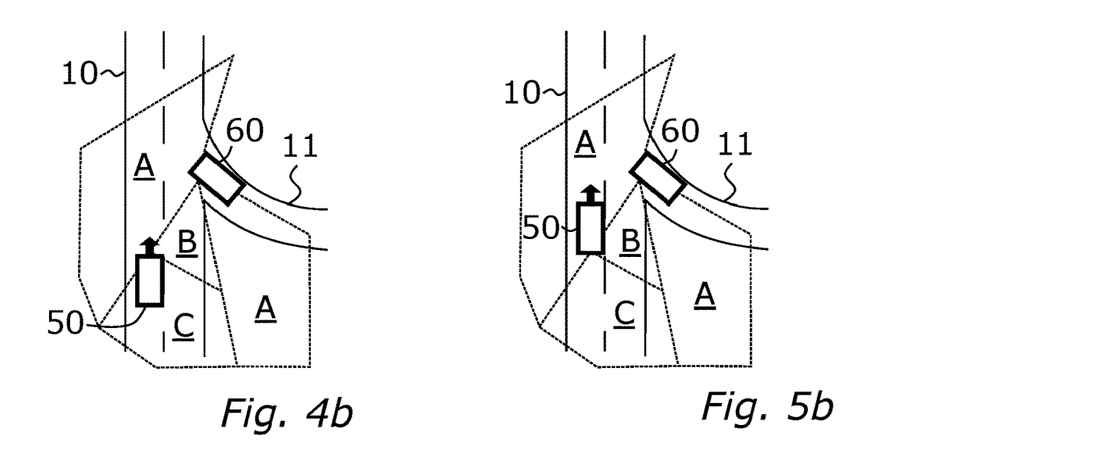
Figure 4C:
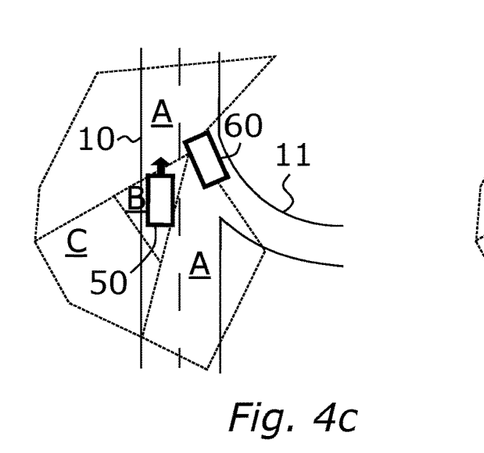

FIG. 4a, FIG. 4b and FIG. 4c illustrate a scenario where a host vehicle 50 is driven on a road 10. A detected vehicle 60 is entering the road 10 via an acceleration lane or entrance road 11. The scenario depicted in FIG. 4a, FIG. 4b and FIG. 4c illustrates a scenario according to the prior art, i.e. where no vehicle observability enhancing system according to embodiments herein is used.

Due to the relative velocities, positions and road directions the host vehicle 50 is in a safe unobservable zone C of vehicle 50 in FIG. 4a. In FIG. 4b the host vehicle continues to be hidden or partly hidden for the driver of the vehicle 60. While the entrance road and the road 10 converge, the distance between host vehicle 50 and the detected vehicle 60 decreases and in FIG. 4c the host vehicle 50 has entered the unsafe unobservable zone B of the vehicle 60. In this scenario a probability that a driver of vehicle 60 has not observed host vehicle 50 is relatively high.

Figure 5C:
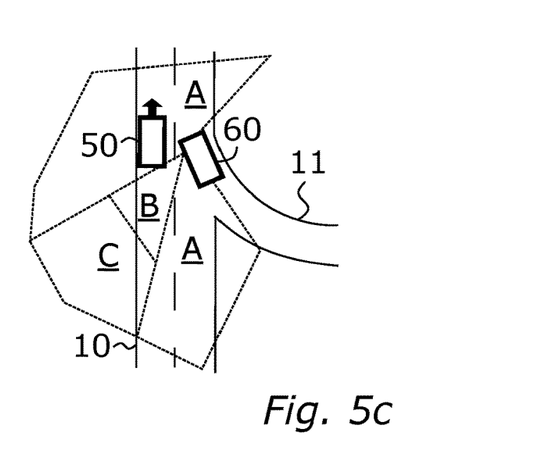

FIG. 5a, FIG. 5b and FIG. 5c illustrate a scenario where the host vehicle 50 is driven on a road 10 and a detected vehicle 60 is entering the road 10 via an acceleration lane or entrance road 11. The scenario depicted in FIG. 5a, FIG. 5b and FIG. 5c illustrates a scenario in which a vehicle observability enhancing system according to embodiments described herein is used for decreasing a risk of collision between the host vehicle 50 and the detected vehicle 60.

As in FIG. 4a, the host vehicle 50 in FIG. 5a is in a safe unobservable zone C of the detected vehicle 60. The host vehicle observability enhancing system determines that the host vehicle is positioned within the safe unobservable zone C of the detected vehicle 60 and generates a control signal indicative of positioning the host vehicle 50 in the observable zone A of the detected vehicle 60. This can be done by accelerating the host vehicle 50, as illustrated in FIG. 5b. In other scenarios the host vehicle 50 can be braked instead.

The host vehicle observability enhancing system can keep the host vehicle 1 in the observable zone A for at least a predefined time duration. After this time duration the host vehicle 50 is allowed to enter an unsafe unobservable zone B of the detected vehicle 60. However, in the FIG. 5 embodiment the host vehicle 50 is not required to enter the unsafe unobservable zone B, the host vehicle may instead continue to drive in the observable zone A.

FIG. 6a, FIG. 6b, 6c and FIG. 6d illustrate a scenario where a host vehicle 50 and a detected vehicle 60 are driven on a road 10. The scenario depicted in FIG. 6a, FIG. 6b, 6c and FIG. 6d illustrates a scenario according to the prior art, i.e. where no vehicle observability enhancing system according to embodiments herein is used.

Figure 6A:
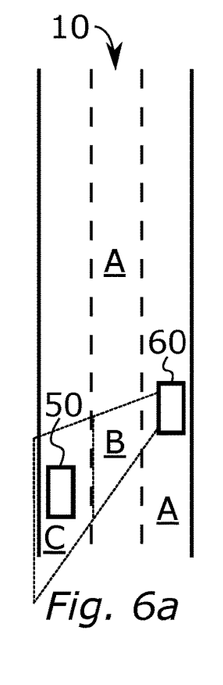
FIGS. 6a, 6b, 6c and 6d illustrate a host vehicle and a detected vehicle according to the prior art in a road environment with three road lanes.

In FIG. 6a is illustrated a scenario where a host vehicle 50 is driving in a safe unobservable zone C of a detected vehicle 60. The zone C is here considered to be safe foremost due to a lateral- or side distance between host vehicle 50 and the detected vehicle 60. As illustrated, a middle lane with no vehicles is present between the host vehicle 50 and the detected vehicle 60. A probability that the detected vehicle 60 relatively fast will alter its position such that a collision between the detected vehicle 60 and the host vehicle 50 will occur is very low. Further, due to the distance and relative positions between the vehicles, the host vehicle 50 will have sufficient time to alter its own position, e.g., by steering and/or accelerating or braking, in order to avoid the collision.

This scenario also illustrates that a safe zone can have different extension in different directions. For example, if the vehicles 50, 60 drive on a motorway, a typical diving velocity can be e.g. 100 km/h, i.e. about 28 m/s. In other words, each second the vehicles moves 28 meters in a longitudinal direction. If a predetermined longitudinal safety distance is 100 meters, it will take a vehicle about 3.6 seconds to drive this distance.

A typical lateral altering velocity, e.g., when a vehicle switch from a first to a second road lane, is much lower, such as about 2-5 km/h, i.e., about 0.6-1.4 m/s. Thus, safety distances in the lateral directions can be much smaller, such as 1-5 meters or the width of a road lane or 50% of the width of a road lane.

According to some embodiment an unsafe zone around a detected vehicle is dependent on a host vehicle velocity, the velocity a detected vehicle, road conditions, light conditions and/or weather conditions. For example; a longitudinal extension of a safe zone to the rear of a detected vehicle can be e.g. 80-150 meters when the detected vehicle 60 has a velocity of 100 km/h. If the detected vehicle has a velocity of 50 km/h a safe zone rearwards can be e.g. 30-60 meters. A lateral extension of a safe zone laterally from a detected vehicle 60 can be e.g. 3-4 meters when the detected vehicle 60 has a velocity of 100 km/h. If the detected vehicle has a velocity of 10 km/h a safe lateral zone can extend e.g. 1-2 meters from the detected vehicle 60.

Figure 6B:
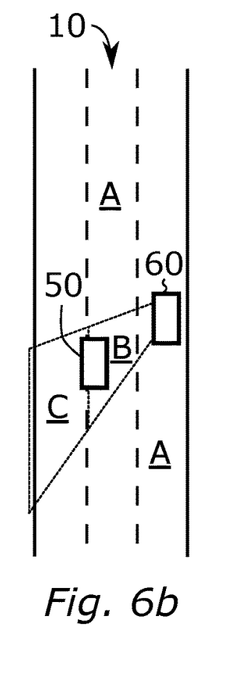
Figure 6C:
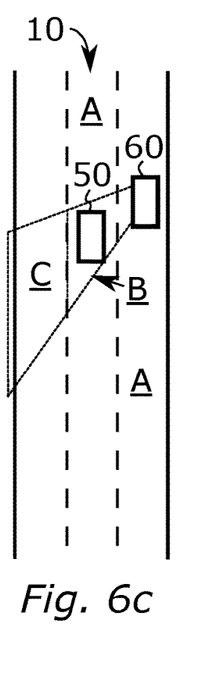
Figure 6D:
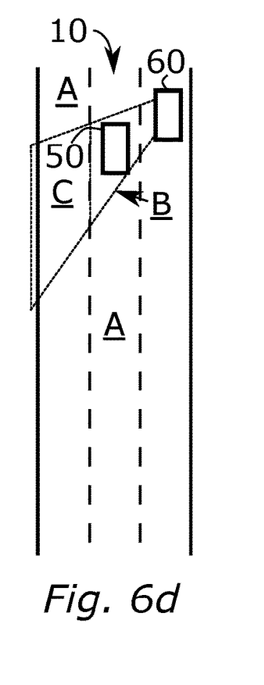

In the scenario illustrated in FIG. 6b the host vehicle 50 enters the middle lane and the unsafe unobservable zone B. In the scenarios depicted in FIGS. 6c and 6d the host vehicle 50 continues to drive alongside the detected vehicle 60 in the unsafe unobservable zone B of the detected vehicle. Since the host vehicle 50 has been positioned in a blind spot of the vehicle 60 throughout the entire lane change maneuver illustrated in FIG. 6a-6d there is a risk that a driver of the vehicle 60 initiates a lane change maneuver to the left, i.e. to the lane in which the host vehicle 60 is positioned. Since the distance between the vehicles is small such a maneuver may lead to a collision.

FIG. 7a, FIG. 7b, 7c and FIG. 7d illustrate a scenario in which a vehicle observability enhancing system according to embodiments described herein is used for decreasing a risk of collision between the host vehicle 50 and the detected vehicle 60.

Figure 7A:
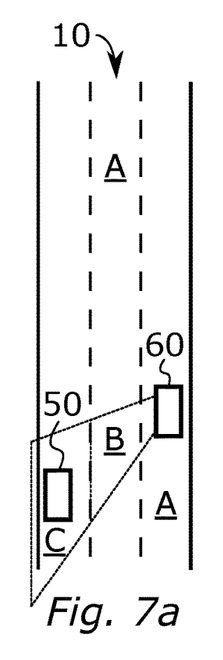
FIGS. 7a, 7b, 7c and 7d illustrate a host vehicle and a detected vehicle according to embodiments herein in a road environment with three road lanes.
Figure 7B:
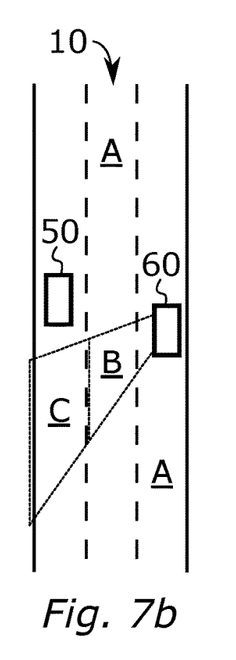
Figure 7C:
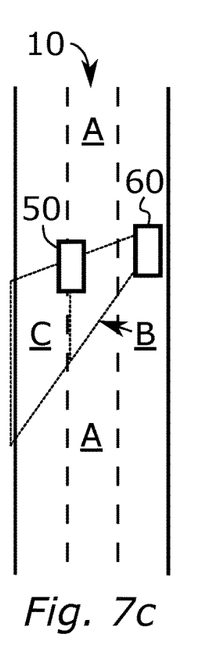
Figure 7D:
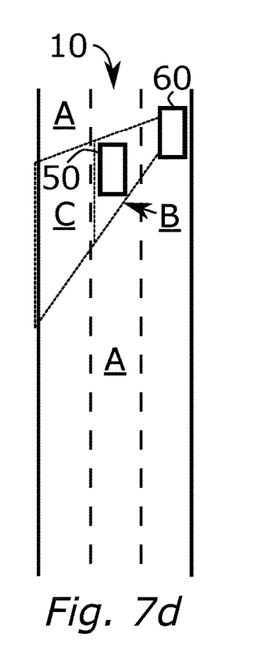

In FIG. 7a is illustrated a scenario where a host vehicle 50 is driving in a safe unobservable zone C of a detected vehicle 60. Before the host vehicle 50 shift lane from the left lane to the middle lane, which is an unsafe unobservable zone, the host vehicle observability enhancing system 1 is arranged to generate a control signal indicative of positioning the host vehicle 50 in an observable zone A of the at least one detected vehicle 60. This is illustrated in FIG. 7b. In this scenario the host vehicle 50 is accelerated relatively the detected vehicle 60 in order to become observable. The host vehicle is then maintained in the observable zone A for a predetermined time duration such that the host vehicle 50 is clearly observable for a driver of the detected vehicle 60. According to some embodiment the host vehicle 50 is within the observable zone A when at least a part of host vehicle B is positioned within the observable zone A. According to some embodiment the host vehicle 50 is within the observable zone A when at least a wheel or pair of wheel of the host vehicle 50 is/are positioned within the observable zone A. Thereafter is the host vehicle 50 allowed to enter the unsafe unobservable zone B of the detected vehicle 60 again, as illustrated in FIGS. 7c and 7d.

Also in FIG. 8a, FIG. 8b, 8c and FIG. 8d is illustrated a scenario in which the vehicle observability enhancing system is used for decreasing a risk of collision between the host vehicle 50 and the detected vehicle 60.

Figure 8A:
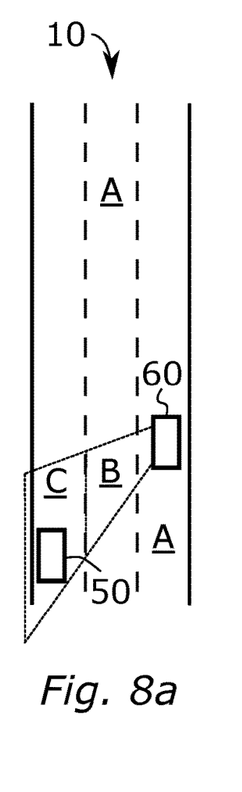
FIGS. 8a, 8b, 8c and 8d illustrate a host vehicle and a detected vehicle according to further embodiments herein in a road environment with three road lanes.
Figure 8B:
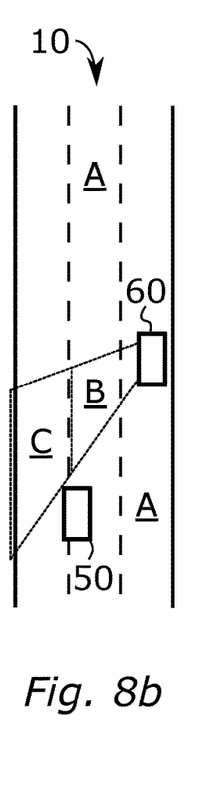
Figure 8C:
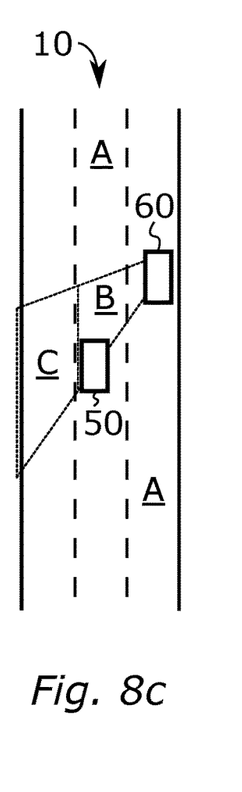
Figure 8D:
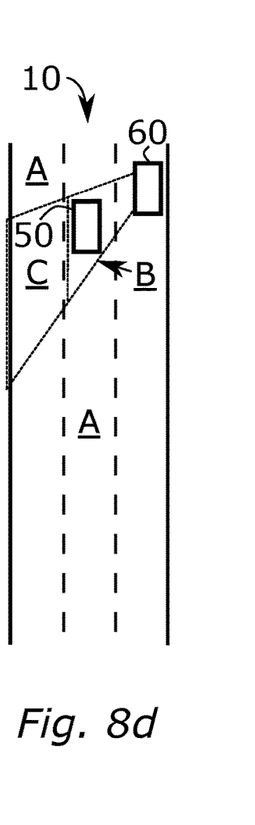

In FIG. 8*a* is illustrated a scenario where a host vehicle 50 is driving in a safe unobservable zone C of a detected vehicle 60. Before the host vehicle 50 shift lane from the left lane to the middle lane, which is an unsafe unobservable zone, the host vehicle observability enhancing system 1 is arranged to generate a control signal indicative of positioning the host vehicle 50 in an observable zone A of at least one detected vehicle 60. This is illustrated in FIG. 8*b*. In this scenario a velocity of the host vehicle 50 is decreased relatively a velocity of the detected vehicle 60 in order to make host vehicle 50 observable for a driver of the detected vehicle 60. The host vehicle 50 is then maintained in the observable zone A for a predetermined time duration such that the host vehicle 50 is clearly observable for a driver of the detected vehicle 60. Thereafter is the host vehicle 50 allowed to enter the unsafe unobservable zone B of the detected vehicle 60 again, as illustrated in FIG. 8*d*.

In the above scenarios some example of unobservable zones has been described. Unobservable zones and other zones can also be defined or described as below.

According to some embodiments an unobservable zone is a zone which a vehicle driver cannot observe within a focus field within a field of view, i.e. a field observed via the macula of the retina (Lat: *macula lutea*) without having to move or rotate his/her head more than a certain angle from an original gaze direction. Such an angle may be e.g. more than 20-60 degrees.

Different zones described herein, such as the observable zone, the unsafe unobservable zone and the safe unobservable zone may also relate to zones and/or fields of vision as referred to in the English version of the Official Journal of the European Union, L 25/1, 29 Jan. 2004: DIRECTIVE 2003/97/EC OF THE EUROPEAN PARLIAMENT AND OF THE COUNCIL of 10 Nov. 2003 on the approximation of the laws of the Member States relating to the type-approval of devices for indirect vision and of vehicles equipped with these devices, amending Directive 70/156/EEC and repealing Directive 71/127/EEC, as retrieved from http://eur-lex.europa.eu/legal-content/EN/TXT/PDF/?uri=CELEX:32003L0097&from=nl Sep. 2, 2015. FIGS. 6-9 referred to in parentheses below are figures belonging to chapters 5.1-5.9 of ANNEX III.

Chapters 5.1-5.9 of ANNEX III of the above-mentioned DIRECTIVE 2003/97/EC relate to requirements for driver's fields of vision, and may serve as examples of observable zones. Unobservable zones may be defined as zones not covered by one or more of the fields of vision referred to below. The reference to DIRECTIVE 2003/97/EC is made for illustrating examples of how the different zones may be defined. However, other definitions may also be applicable.

According to some embodiments an observable zone is the field of vision required for interior rear-view mirrors (Class I), as defined in Chapter 5.1.; "The field of vision must be such that the driver can see at least a 20 m wide, flat, horizontal portion of the road centered on the vertical longitudinal median plane of the vehicle and extending from 60 m behind the driver's ocular points (FIG. 6) to the horizon."

According to some embodiments an observable zone is the field of vision required for exterior rear-view mirrors (Class II) on the driver's side, as defined in Chapter 5.2.1.; "The field of vision must be such that the driver can see at least a 5 m wide, flat, horizontal portion of the road, which is bounded by a plane which is parallel to the median longitudinal vertical plane and passing through the outermost point of the vehicle on the driver's side of the vehicle and extends from 30 m behind the driver's ocular points to the horizon. In addition, the road must be visible to the driver over a width of 1 m, which is bounded by a plane parallel to the median longitudinal vertical plane and passing through the outermost point of the vehicle starting from a point 4 m behind the vertical plane passing through the driver's ocular points (see FIG. 7)."

According to some embodiments an observable zone is the field of vision required for exterior rear-view mirrors (Class II) on the passenger's side, as defined in Chapter 5.2.2.; "The field of vision must be such that the driver can see at least a 5 m wide, flat, horizontal portion of the road, which is bounded on the passenger's side by a plane parallel to the median longitudinal vertical plane of the vehicle and passing through the outermost point of the vehicle on the passenger's side and which extends from 30 m behind the driver's ocular points to the horizon. In addition, the road must be visible to the driver over a width of 1 m, which is bounded by a plane parallel to the median longitudinal vertical plane and passing through the outermost point of the vehicle starting from a point 4 m behind the vertical plane passing through the driver's ocular points (see FIG. 7)."

According to some embodiments an observable zone is the field of vision required for exterior rear-view mirrors (Class III) on the driver's side, as defined in Chapter 5.3.1.; "The field of vision must be such that the driver can see at least a 4 m wide, flat, horizontal portion of the road, which is bounded by a plane parallel to the median longitudinal vertical plane and passing through the outermost point of the vehicle on the driver's side of the vehicle and extends from 20 m behind the driver's ocular points to the horizon (see FIG. 8). In addition, the road must be visible to the driver over a width of 1 m, which is bounded by a plane parallel to the median longitudinal vertical plane and passing through the outermost point of the vehicle starting from a point 4 m behind the vertical plane passing through the driver's ocular points."

According to some embodiments an observable zone is the field of vision required for exterior rear-view mirrors (Class III) on the passenger's side, as defined in Chapter 5.3.2.; "The field of vision must be such that the driver can see at least a 4 m wide flat, horizontal portion of the road which is bounded by a plane parallel to the median longitudinal vertical plane passing through the outermost point of the vehicle on the passenger's side and which extends from 20 m behind the driver's ocular points to the horizon (see FIG. 8). In addition, the road must be visible to the driver over a width of 1 m which is bounded by a plane which is parallel to the median longitudinal vertical plane and passing through the outermost point of the vehicle starting from a point 4 m behind the vertical plane passing through the driver's ocular points."

According to some embodiments an observable zone is the field of vision required for wide-angle exterior rear-view mirrors (Class IV) on the driver's side, as defined in Chapter 5.4.1.; "The field of vision must be such that the driver can see at least a 15 m-wide, flat, horizontal portion of the road, which is bounded by a plane parallel to the median longitudinal vertical plane of the vehicle and passing through the outermost point of the vehicle on the driver's side and which extends from at least 10 to 25 m behind the driver's ocular points. In addition, the road must be visible to the driver over a width of 4.5 m, which is bounded by a plane parallel to the median longitudinal vertical plane and passing through the outermost point of the vehicle starting from a point 1.5 m behind the vertical plane passing through the driver's ocular points (see FIG. 9)."

According to some embodiments an observable zone is the field of vision required for wide-angle exterior rear-view mirrors (Class IV) on the passenger's side, as defined in Chapter 5.4.2.; "The field of vision must be such that the driver can see at least a 15 m-wide, flat, horizontal portion of the road, which is bounded by a plane parallel to the median longitudinal vertical plane of the vehicle and passing through the outermost point of the vehicle on the passenger's side and which extends from at least 10 to 25 m behind the driver's ocular points. In addition, the road must be visible to the driver over a width of 4, 5 m, which is bounded by a plane parallel to the median longitudinal vertical plane and passing through the outermost point of the vehicle starting from a point 1, 5 m behind the vertical plane passing through the driver's ocular points (see FIG. 9)."

According to some embodiments an observable zone is the field of vision required for close-proximity exterior mirrors (Class V) in chapter 5.5 and according to some embodiments an observable zone is the field of vision required for front mirrors (Class VI) in chapter 5.6.

According to some embodiments an unobservable zone is one or more fields within the host vehicle surrounding which is/are outside one or more of the observable zones, e.g. as defined above. In addition, obstructions of various kinds may cause a zone or section to be, at least partly, unobservable. As mentioned in ANNEX III, Chapter 5.8 of the DIRECTIVE 2003/97/EC, such obstructions can be e.g.; "the presence of headrest and devices such as, in particular, sun visors, rear windscreen wipers, heating elements and stop lamp of category S3 or by components of bodywork such as window columns of rear split doors".

According to some embodiments an unsafe unobservable zone is a an unobservable zone of the host vehicle which also is relatively near the host vehicle such that a collision between the host vehicle and a vehicle within the unsafe unobservable zone may occur if vehicle trajectories of the vehicles cross each other.

According to some embodiments a safe unobservable zone is an unobservable zone of the host vehicle which is relatively far from the host vehicle, such that it is unlikely that a collision between the vehicles occur.

An unsafe unobservable zone can e.g. be defined as an unobservable zone within a predetermined distance from the host vehicle. Such distance may vary with a velocity of the host vehicle and/or a surrounding vehicle. If velocities are relatively high, such as on highways and motorways, a predetermined distance can be e.g. about 100 m or even longer. For low velocities, such as in cities and/or traffic jams, the distance may be relatively short, such as 5-10 m. As mentioned above, the predetermined distance can be dependent on other factors, such as which road lanes the host vehicle and detected vehicles drive within. If the host vehicle and a detected vehicle are driving in different lanes the distance can be relatively short and if the host vehicle and the detected vehicle drive in the same lane a longer distance can be necessary.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A host vehicle observability enhancing system comprising:
   a processing unit; and
   at least one sensor configured to monitor a sensor coverage area of a host vehicle surrounding and to provide the processing unit with information on detected vehicles within the sensor coverage area,
   wherein the vehicle observability enhancing system is configured to determine when the host vehicle is positioned within selectively one of
      an observable zone (A) of at least one detected vehicle,
      an unsafe unobservable zone (B) of the at least one detected vehicle, or
      a safe unobservable zone (C) of at least one detected vehicle,
   wherein, when the host vehicle is positioned within the observable zone (A) of at least one detected vehicle, the vehicle observability enhancing system is configured to generate a control signal indicative of maintaining the host vehicle in the observable zone (A) of that at least one detected vehicle for at least a predefined time duration before the host vehicle is allowed to enter the unsafe unobservable zone (B) of that at least one detected vehicle,
   wherein, when the system determines that the host vehicle is positioned within the safe unobservable zone (C) of at least one detected vehicle, the system is configured to generate a control signal indicative of positioning the host vehicle in the observable zone (A) of that at least one detected vehicle, and
   wherein the control signal is provided to a semi-autonomous or autonomous drive arrangement configured to control the host vehicle in accordance with the control signal.

2. The vehicle system according to claim 1 wherein the predefined time duration is at least 3 seconds.

3. The vehicle system according to claim 1 further comprising a semi-autonomous drive arrangement which is arranged to control at least one of steering and velocity of the host vehicle at least partly based on information received from the at least one sensor, wherein the semi-autonomous drive arrangement is further configured to control the host vehicle in accordance with the control signal.

4. The vehicle system according to claim 3 wherein the system is configured to generate a control signal indicative of at least one of
   a first host vehicle velocity profile and a first host vehicle steering profile to the semi-autonomous drive arrangement when the host vehicle is positioned within an observable zone (A) of at least one detected vehicle, and
   at least one of a second host vehicle velocity profile and a second host vehicle steering profile when the host vehicle is positioned within an unsafe unobservable zone (B) of the at least one detected vehicle.

5. The vehicle system according to claim 1 further comprising an autonomous drive arrangement which is arranged to autonomously control steering and velocity of the host vehicle at least partly based on information received from the at least one sensor, wherein the autonomous drive arrangement is further configured to autonomously control the host vehicle in accordance with the control signal.

6. The vehicle system according to claim 5 wherein the system is configured to generate a control signal indicative of at least one of
- a first host vehicle velocity profile and a first host vehicle steering profile to the autonomous drive arrangement when the host vehicle is positioned within an observable zone (A) of at least one detected vehicle, and
- at least one of a second host vehicle velocity profile and a second host vehicle steering profile when the host vehicle is positioned within an unsafe unobservable zone (B) of the at least one detected vehicle.

7. The vehicle system according to claim 1 further comprising an alert arrangement configured to generate at least one of a visual alert, an audio alert, and a haptic alert into a host vehicle passenger compartment in accordance with the control signal.

8. The vehicle system according to claim 1 wherein the system is configured to divide the sensor coverage area into different zones based on the relative positions of the host vehicle and at least one detected vehicle.

9. A vehicle comprising a vehicle observability enhancing system according to claim 1.

10. A method for increasing vehicle observability for a host vehicle having a vehicle observability enhancing system comprising a processing unit and at least one sensor which is arranged to monitor a sensor coverage area of a host vehicle surrounding and further to provide the processing unit with information on detected vehicles within the sensor coverage area, the method comprising:
- determining, by the vehicle observability enhancing system, when the host vehicle is positioned within selectively one of
  - an observable zone (A) of at least one detected vehicle,
  - an unsafe unobservable zone (B) of the at least one detected vehicle, or
  - a safe unobservable zone (C) of at least one detected vehicle, and
- generating, when the host vehicle is positioned within the observable zone (A) of the at least one detected vehicle, a control signal indicative of maintaining the host vehicle in the observable zone (A) of that at least one detected vehicle for at least a predefined time duration before the host vehicle is allowed to enter the unsafe unobservable zone (B) of that at least one detected vehicle, and
- generating, when it is determined that the host vehicle is positioned within the safe unobservable zone (C) of at least one detected vehicle, a control signal indicative of positioning the host vehicle in an observable zone (A) of that at least one detected vehicle,
- wherein the control signal is provided to a semi-autonomous or autonomous drive arrangement configured to control the host vehicle in accordance with the control signal.

* * * * *